Aug. 4, 1925.
A. E. ANDERSON
VALVE
Filed July 16, 1924
1,548,241
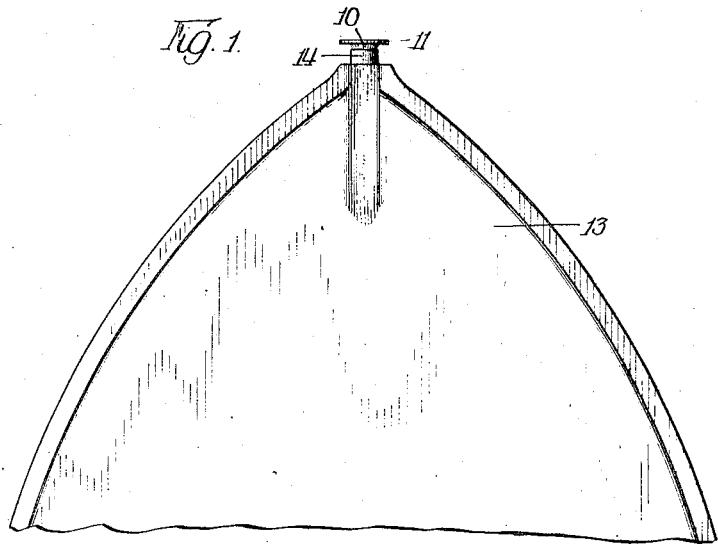
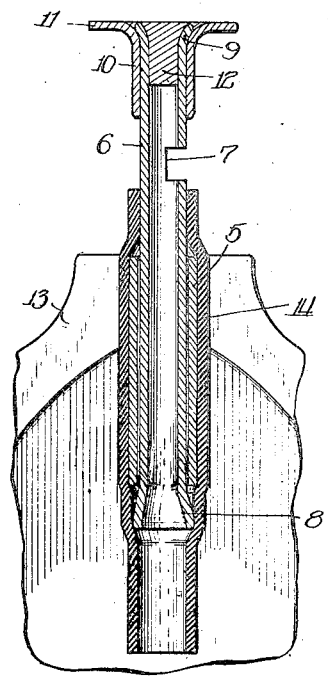
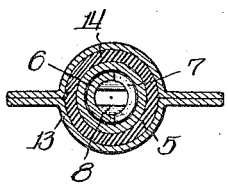
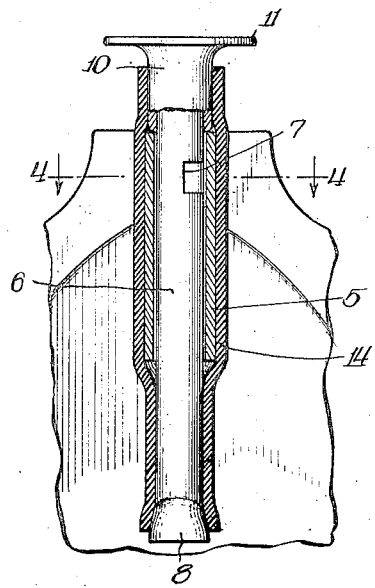
Witness:
R. Burkhardt.
Inventor:
Arvid E. Anderson,
By Kent W. Wonnell
atty.

Patented Aug. 4, 1925.

1,548,241

UNITED STATES PATENT OFFICE.

ARVID E. ANDERSON, OF CHICAGO, ILLINOIS, ASSIGNOR, BY MESNE ASSIGNMENTS, TO AIRUBBER CORPORATION, OF CHICAGO, ILLINOIS, A CORPORATION OF ILLINOIS.

VALVE.

Application filed July 16, 1924. Serial No. 726,267.

*To all whom it may concern:*

Be it known that I, ARVID E. ANDERSON, a citizen of the United States, residing at Chicago, in the county of Cook and State of Illinois, have invented certain new and useful Improvements in a Valve, of which the following is a specification.

This invention relates more particularly to an air valve for use in connection with water wings, balloons, air cushions, and other inflated devices, although of course it may have a more general use wherever applicable. The principal object of the invention is to provide a simple, reliable and inexpensive device of this kind which is effective and not likely to get out of order even when made in small sizes; another object of the invention is to provide a valve of this kind which is easily operated and will stay in either open or closed position, and of which the parts will not easily become separated or out of order.

In the accompanying drawings, Fig. 1 is a view in elevation of the valve applied to one end of an inflatable cushion; Fig. 2 is a section showing the valve in open position; Fig. 3 is a section showing the valve in closed position; and Fig. 4 is a cross section taken on the line 4—4 of Fig. 3.

This valve is designed and intended to be applied to all kinds of inflatable devices, and the valve proper is preferably vulcanized in place at the time the cushion is made so that there is no question or possibility of a leak around the valve itself.

In carrying out this invention, a short metal sleeve 5 is provided in which a longer hollow stem 6 fits closely but permitting of a free longitudinal sliding movement.

Adjacent one end of the stem a notch 7 is cut for the admission and discharge of air (or any other fluid), and after the stem 6 is inserted in the sleeve, the end 8 opposite the notch 7 is slightly flattened or made oval so that it can not be drawn through the sleeve. The other end of the stem is expanded as at 9, and a cap or head 10 is preferably secured thereto which has a flange 11 at the end forming an extension which can be easily grasped by the fingers of an operator for moving the stem longitudinally in the sleeve. This end of the stem is also provided with a plug 12 of solder or any other suitable material, the cap being preferably soldered to the end of the stem for securing it in place.

The valve as above described, is complete in itself and in applying it to an inflated device, as 13, a flexible tubular member 14, preferably rubber, which fits tightly over the sleeve 5 is applied thereto and extends beyond the sleeve at both ends. The tubular member is then inserted at the edge of the device 13 where it is either cemented or vulcanized in place, with the outer end of the tubular member 14 extending slightly beyond the adjacent edge of the device 13. The tubular member is still flexible but makes an air-tight connection between the adjacent walls of the device 13, and the outer surface of the sleeve member 5 to which it may also be cemented or vulcanized.

In operating the valve the stem is either pulled out to uncover the notch 7, as shown in Fig. 2, or it is pushed in so that the outer end of the tubular member 14 extends over the inner end of the cap 10, thus making an air-tight connection with the cap itself and preventing the escape of air or other fluid from the valve notch 7.

With this construction it is apparent that the valve is easily operated and is not likely to get out of order. It is also clearly fluid-tight and in order to prevent the escape of air, for example, when a device 13 is inflated, the inner end of the tubular member 14 may be pinched shut until the stem 6 is pressed inwardly to cover the notch 7 which will thereupon prevent the escape of air. Having no springs or unbalanced pressure, the valve will stay in any position in which it is placed without danger of accidental shifting and can only be moved by manual engagement of the flange head of the stem. It is obvious that other changes may be made in the construction, combination and arrangement of the parts without departing from the spirit and scope of the invention.

I claim:

1. In a valve of the class described, a sleeve making an air tight connection on the outside with the article with which it is applied, and a slidable hollow stem movable in the sleeve closed at the outer end but having a notch communicating with the interior thereof at a distance from the end, the notch being covered by the sleeve when the stem is inserted within the sleeve.

2. In a valve of the class described, the combination with a hollow tubular member making an airtight connection on the outside with the article to which it is applied, and a hollow valve member slidable within the other member closed at its outer end and having a notch adjacent the outer end which is covered by the first mentioned member when the slidable member is inserted within the other member.

3. In a valve of the class described, a sleeve, a hollow valve stem slidable in the sleeve, a flexible tubular member extending over the sleeve and beyond the ends thereof, the stem being closed at its outer end but having an opening in the stem at a distance from the end, the opening being disposed within the sleeve when the stem is pushed in and the tubular member making an airtight connection at the outer end of the stem.

4. In a valve of the class described, a sleeve member and a hollow stem slidable in the sleeve, the stem being provided with a closed head at one end for limiting its movement with the sleeve and with a lateral aperture and the other end of the stem being open and distorted after the same is inserted through the sleeve to prevent the withdrawal of the stem from the sleeve.

5. In a valve of the class described, the combination with a hollow tubular valve stem, of means for providing a close-fitting slidable connection therefor, the stem being provided with means for preventing the withdrawal of the stem, and a lateral opening at a distance from the outer end thereof, and a closed head at the outer end including a flange projection for moving the stem in and out.

6. In a valve of the class described, a hollow tubular member closed at one end and slightly flattened at the other with a lateral opening adjacent the closed end, a sleeve surrounding the tubular member and in which it is slidable, a resilient member surrounding the sleeve and extending beyond the ends thereof, the outer end bearing against the tubular member and adapted to make an air-tight connection therewith.

7. In a valve of the class described, the combination with a hollow tubular stem closed at one end and slightly distorted at the other with a lateral opening adjacent the closed end, a cap with an extending flange at the closed end, a sleeve shorter than the stem in which the latter is slidable, a flexible resilient tube surrounding the sleeve and adapted to make an air-tight connection, the flexible resilient tube making an airtight connection with the article to which it is applied.

8. The combination with an inflatable article, of a flexible tubular member extending therefrom and making an airtight connection at the outside of the tubular member, a short sleeve insertable within the tubular member and making an airtight connection at the inside of the tubular member, and a hollow stem slidable within the sleeve and tubular member having a slightly flattened inner end to limit its outward movement with respect to the sleeve and having a lateral opening adjacent the outer end of the stem and beyond the projecting portion of the flexible tubular member when the stem is in its outer position, means for closing the outer end of the stem, and a head at the outer end of the stem comprising a flange by means of which the stem can be slidable moved to cover and uncover the opening.

ARVID E. ANDERSON.